March 17, 1959
J. F. KADER
2,878,027
FLOATING TAP HOLDER
Filed June 13, 1957
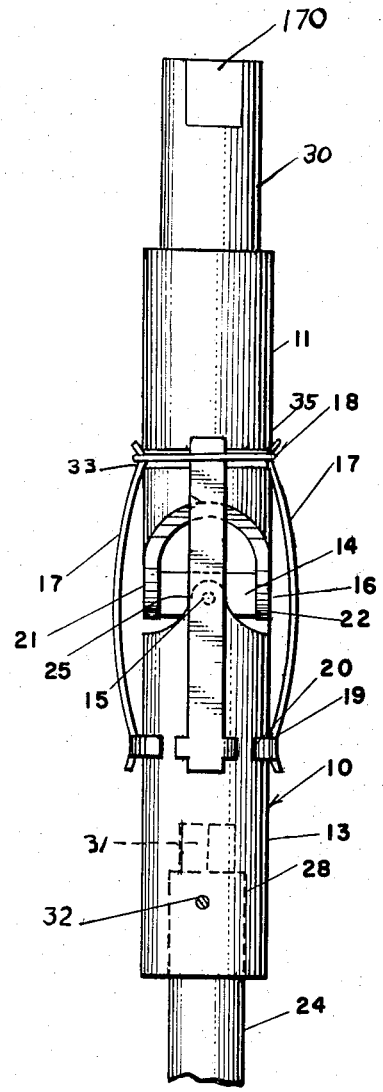
INVENTOR.
JOHN FORREST KADER
BY
Charles T. Lovercheck
ATTORNEY

United States Patent Office 2,878,027
Patented Mar. 17, 1959

2,878,027

FLOATING TAP HOLDER

John Forrest Kader, Erie, Pa.

Application June 13, 1957, Serial No. 665,543

1 Claim. (Cl. 279—16)

This invention relates to tap holders and, more particularly, to devices to be attached in the chuck of a drill press or the like for holding a thread cutting tap.

Flexible connections have been previously provided to connect taps to tap wrenches to prevent tap breakage where the hole into which the tap is to be run is slightly out of alignment with the tap. When a drill press is used for tapping, the tap is likely to be broken during the tapping operation. Where universal chucks for drill press tapping operations have been provided, there are no means for holding the tap in alignment with the press quill before the tap enters the hole. Therefore, the tap is inclined to swing around and cause injury to the operator, breakage to the machine, and other damage.

The present invention comprises a chucking device for attaching to a tap universally connected to a shank portion to be held in a drill press chuck and a resilient means for holding the tap in general alignment with the shank when the tap is not entering a hole to be tapped.

It is, accordingly, an object of this invention to provide a simple and efficient tap holder of the nature described which may be easily and readily operated.

Another object of this invention is to provide a tap holder which is inexpensive to manufacture, durable, strong, and well adapted to the purpose for which it is designed.

Another object of the invention is to provide a universal connection for connecting a tap to a rotating chuck and a resilient means to hold the tap in alignment with the chuck.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

The figure of the drawing shows a tap holder according to the invention.

Now with more specific reference to the drawing, a tap holder 10 is shown having a shank 11 universally connected to a chuck portion 13 which is attached to a tap 24. The shank 11 has a reduced size portion 30 which is adapted to be received in a drill press chuck and which has flat surfaces 170 which are particularly suitable for this purpose. The surfaces 170 are also suitable for engaging a wrench or the like for rotating the holder 10.

The tap 24 is inserted into an opening 28 in the chuck portion 13. The upper end of the tap 24 is received in a square aperture 31 and held in place by a screw 32.

Two end portions 21 and 22 depend from the shank 11 in spaced relation to each other and have a block 14 disposed therebetween and rotatably supported in the space between the end portions 21 and 22 by a pin 16. Similar spaced end portions 25 are integrally attached to the chuck portion 13. The block 14 is also disposed between the end portions 25 and a pin 15 extends through the spaced end portions 25 and through the block 14.

The universal joint connection between the chuck portion 13 and the shank 11 is very similar to a standard universal connection and will be readily understood by those skilled in the art. If no restraining means were provided for holding the chuck portion 13 in alignment with the shank 11, the chuck portion 13 would swing around dangerously when the tap 24 was rotated at high speed and was not engaging a hole. Therefore, in order to hold the chuck portion 13 in alignment with the shank 11, spring members 17 are provided. The springs 17 are attached to the shank 11 by means of a band 18. The spring members 17 are bent and the bent portion is disposed in peripheral groove 35 formed in the chuck portion 13. The band 18 overlies the springs 17 and holds them in the groove 35. The upper ends of the springs 17 are bent at 33 and they curve outwardly therefrom and then inwardly and terminate in inwardly facing concave members 20 which are attached to the lower ends of the springs 17 at 19 and engage the outer surface of the chuck portion 13. The spring members 17 restrain the chuck portion 13 to run in general alignment with the shank 11 during the operation of the device.

The foregoing specification sets forth the invention in its preferred practical forms but the structure shown is capabale of modification within a range of equivalents without departing from the invention which is to be understood is broadly novel as is commensurate with the appended claim.

The embodiments of the invention in which an exclusive property or privilege is claimed are defined as follows:

A tap holder comprising a shank adapted to be held in a chuck of a rotating member, a chuck portion, a tap attached to one end of said chuck portion, a universal joint connection between said chuck portion and said shank, spring members attached to said chuck portion curving outwardly and inwardly therefrom and engaging said chuck portion at their distal ends, said spring members being spaced around the periphery of said chuck portion and said shank, said spring members being attached to said shank by means of a peripheral groove in said shank, one end of each said spring member being bent and the bent portions disposed in said groove, and a band overlying said bent portions of said spring members holding said spring members in said groove, each said spring member being made of flat, relatively thin material and having concave members at the distal end thereof extending laterally therefrom, said concave members being formed generally to overlie said chuck portion, each said concave member being coextensive with a portion of the surface of the outer surface of said chuck.

References Cited in the file of this patent

UNITED STATES PATENTS

| | | |
|---|---|---|
| 1,179,511 | Egan | Apr. 18, 1916 |
| 1,381,155 | Wood | June 14, 1921 |
| 2,063,753 | Pohlman | Dec. 8, 1936 |